(12) United States Patent
Qiao et al.

(10) Patent No.: US 10,989,947 B2
(45) Date of Patent: Apr. 27, 2021

(54) ARRAY SUBSTRATE, LIQUID CRYSTAL DISPLAY PANEL AND DISPLAY DEVICE WITH NO FLOATING TOUCH SIGNAL LINES

(71) Applicants: Ordos Yuansheng Optoelectronics Co., Ltd., Inner Mongolia (CN); BOE Technology Group Co., Ltd., Beijing (CN)

(72) Inventors: Yun Qiao, Beijing (CN); Zhen Wang, Beijing (CN); Fei Huang, Beijing (CN); Xiaozhou Zhan, Beijing (CN); Han Zhang, Beijing (CN); Wenwen Qin, Beijing (CN); Jian Sun, Beijing (CN)

(73) Assignees: Ordos Yuansheng Optoelectronics Co., Ltd., Inner Mongolia (CN); BOE Technology Group Co., Ltd., Beijing (CN)

(*) Notice: Subject to any disclaimer, the term of this patent is extended or adjusted under 35 U.S.C. 154(b) by 211 days.

(21) Appl. No.: 16/328,562

(22) PCT Filed: May 23, 2018

(86) PCT No.: PCT/CN2018/088064
§ 371 (c)(1),
(2) Date: Feb. 26, 2019

(87) PCT Pub. No.: WO2019/033815
PCT Pub. Date: Feb. 21, 2019

(65) Prior Publication Data
US 2021/0026179 A1  Jan. 28, 2021

(30) Foreign Application Priority Data
Aug. 18, 2017  (CN) .......................... 201710712562.2

(51) Int. Cl.
*G02F 1/1333* (2006.01)
*G02F 1/1362* (2006.01)
*G06F 3/041* (2006.01)

(52) U.S. Cl.
CPC .... *G02F 1/13338* (2013.01); *G02F 1/136286* (2013.01); *G06F 3/04164* (2019.05)

(58) Field of Classification Search
CPC ......... G06F 3/041–047; G06F 3/04164; G02F 1/3338; G02F 1/136286
See application file for complete search history.

(56) References Cited

U.S. PATENT DOCUMENTS

2017/0168650 A1* 6/2017 Lee .................. G02F 1/134309
2018/0210587 A1  7/2018 Zhang et al.
2018/0314371 A1  11/2018 Jin et al.

FOREIGN PATENT DOCUMENTS

CN  101593069 A  12/2009
CN  104317448 A  1/2015
(Continued)

OTHER PUBLICATIONS

Office Action for corresponding Chinese Application 201710712562.2 dated Jun. 2, 2020.
(Continued)

*Primary Examiner* — Laurence J Lee
(74) *Attorney, Agent, or Firm* — Arent Fox LLP; Michael Fainberg

(57) ABSTRACT

Disclosed are an array substrate, a liquid crystal display panel and a display apparatus. The array substrate comprises a plurality of pixel units, with each of which being provided with a plurality of sub-pixels (R, G, B) arranged in a first direction; a plurality of touch control electrodes, a region where each of the touch control electrodes is located overlapping with a region where the plurality of sub-pixels (R, G, B) are located; and a plurality of touch control signal lines
(Continued)

arranged in gaps between the sub-pixels (R, G, B), wherein each of the touch control signal lines is connected to each of the touch control electrodes, there is no touch control floating signal line not connected to each of the touch control electrodes, and one column of pixel units is correspondingly provided with one touch control signal line.

20 Claims, 9 Drawing Sheets

(56) References Cited

FOREIGN PATENT DOCUMENTS

| | | |
|---|---|---|
| CN | 105652498 A | 6/2016 |
| CN | 205507718 U | 8/2016 |
| CN | 105988240 A | 10/2016 |
| CN | 106445251 A | 2/2017 |
| CN | 106873226 A | 6/2017 |
| CN | 106896961 A | 6/2017 |
| CN | 106959560 A | 7/2017 |
| CN | 206331215 A | 7/2017 |
| KR | 20170076867 A | 7/2017 |

OTHER PUBLICATIONS

Office Action for corresponding Chinese Application 201710712562.2 dated May 24, 2019.
International Search Report for PCT/CN2018/088064 dated Sep. 4, 2018.

* cited by examiner

ARRAY SUBSTRATE, LIQUID CRYSTAL DISPLAY PANEL AND DISPLAY DEVICE WITH NO FLOATING TOUCH SIGNAL LINES

This application is a National Stage of International Application No. PCT/CN2018/088064, filed May 23, 2018, which claims priority to Chinese Patent Application No. 201710712562.2, filed Aug. 18, 2017, both of which are hereby incorporated by reference in their entireties.

FIELD

This disclosure relates to the field of display technologies, and particularly to an array substrate, a liquid crystal display panel and a display device.

BACKGROUND

At present, in an in-cell touch panel, a dual source pixel design is generally adopted, that is, each pixel unit is provided with a touch signal line and a data signal line in parallel, i.e. the touch signal line and the data signal line extend in the same direction. Since the number of touch signal lines is the same as the number of columns of pixel units, and the number of touch electrodes is often smaller than the number of the columns of pixel units, not every touch signal line is connected to a touch electrode to transmit a touch signal, so that there exist a floating touch signal line that is not connected to any touch electrode. With the development of the touch panel, the demand for a touch panel with a high PPI (pixels per inch) is also increasing. In the above-mentioned design of a dual source in-cell touch panel, in order to ensure that a pixel pitch of each pixel unit remains unchanged, in the case of adding the touch signal lines, an aperture ratio of a sub-pixel can only be reduced, which has a significant influence on the pixel aperture ratio in the case of high PPI demand.

SUMMARY

The embodiments of the disclosure provide an array substrate, including: a plurality of pixel units distributed in an array, where each of the plurality of pixel units includes several sub-pixels arranged in a first direction; a plurality of touch electrodes distributed in an array, where an area where each of the plurality of touch electrodes is located overlaps with an area where a plurality of sub-pixels are located; and a plurality of touch signal lines arranged at gaps of sub-pixels; where each of the plurality of touch signal lines is connected with a touch electrode, and no touch floating signal line that is not connected with any touch electrode is present; where respective touch signal lines extend in a second direction and are arranged in the first direction, the first direction intersects with the second direction; and a column of the plurality of pixel units is correspondingly provided with one of the touch signal lines.

Optionally, in the array substrate according to the embodiments of the disclosure, one of the plurality of touch electrodes is connected with one of the plurality of touch signal lines in a one-to-one correspondence manner.

Optionally, in the array substrate according to the embodiments of the disclosure, the first direction refers to a row direction, the second direction refers to a column direction, and every two adjacent touch signal lines are spaced apart from each other by the same number of sub-pixel columns which is greater than the number of sub-pixel columns included in one column of the plurality of pixel units.

Optionally, in the array substrate according to the embodiments of the disclosure, column gaps of sub-pixels provided with a touch signal line are larger than column gaps of the other sub-pixels.

Optionally, the array substrate according to the embodiments of the disclosure further includes: a plurality of data signal lines arranged at gaps of respective sub-pixel columns; where each of the plurality of touch signal lines is arranged in the same layer as each of the plurality of data signal lines.

Optionally, in the array substrate according to the embodiments of the disclosure, the first direction refers to a column direction, the second direction refers to a row direction, and every two adjacent touch signal lines are spaced apart from each other by the same number of sub-pixel rows which is greater than the number of the sub-pixel rows included in one row of the plurality of pixel units.

Optionally, in the array substrate according to the embodiments of the disclosure, row gaps of sub-pixels provided with a touch signal line are larger than row gaps of the other sub-pixels.

Optionally, the array substrate according to the embodiments of the disclosure further includes: a plurality of gate signal lines arranged at gaps of respective sub-pixel rows; where each of the plurality of touch signal lines is arranged in the same layer as each of the plurality of gate signal lines.

Optionally, in the array substrate according to the embodiments of the disclosure, opening areas of respective sub-pixels are same.

Optionally, in the array substrate according to the embodiments of the disclosure, each of the plurality of touch signal lines is adjacent to sub-pixels of the same color.

Optionally, in the array substrate according to the embodiments of the disclosure, each of the plurality of touch signal lines is adjacent to blue sub-pixels.

Optionally, in the array substrate according to the embodiments of the disclosure, the plurality of touch electrodes are reused as a common electrode of the array substrate.

Correspondingly, the embodiments of the disclosure further provide a liquid crystal display panel including the array substrate above according to the embodiments of the disclosure.

Correspondingly, the embodiments of the disclosure further provide a display device including the liquid crystal display panel above according to the embodiments of the disclosure.

DETAILED DESCRIPTION OF THE EMBODIMENTS

Figure 1:
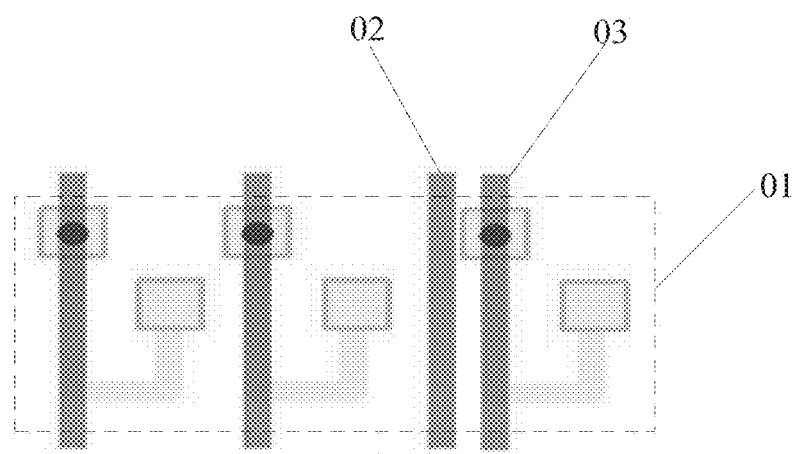
FIG. 1 is a schematic structural diagram of an arrangement of touch signal lines in a pixel unit in the related art.
Figure 2:
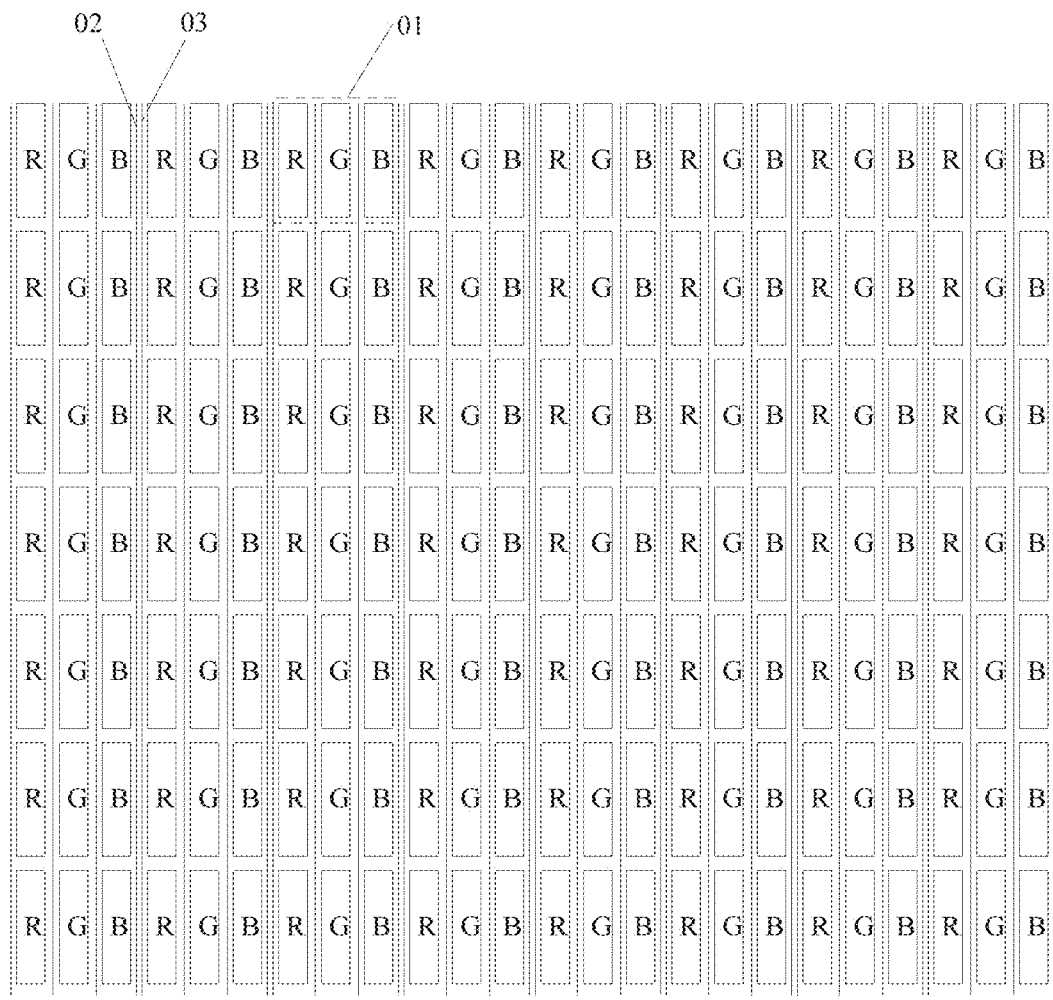
FIG. 2 is an overall schematic diagram of a routing layout in an array substrate of a dual source in-cell touch panel in the related art.

As illustrated in FIG. 1, an in-cell touch panel generally using a dual source pixel design may include: a plurality of pixel units 01, where each of the pixel units 01 is correspondingly provided with a touch signal line 02 and a data signal line 03, and the touch signal line 02 and the data signal line 03 are arranged in parallel (i.e. both extend in the same direction). FIG. 2 illustrates an overall schematic diagram of a routing layout in an array substrate of a dual source in-cell touch panel. At present, a pixel unit 01 is generally comprised of a red sub-pixel R, a blue sub-pixel B and a green sub-pixel G, and one touch signal line 02 needs to be added between a blue sub-pixel B of each pixel unit 01 and a red sub-pixel R of a next pixel unit 01, so that an aperture ratio of each pixel unit 01 on the array substrate will decrease due to the addition of the touch signal line 02.

Figure 3:
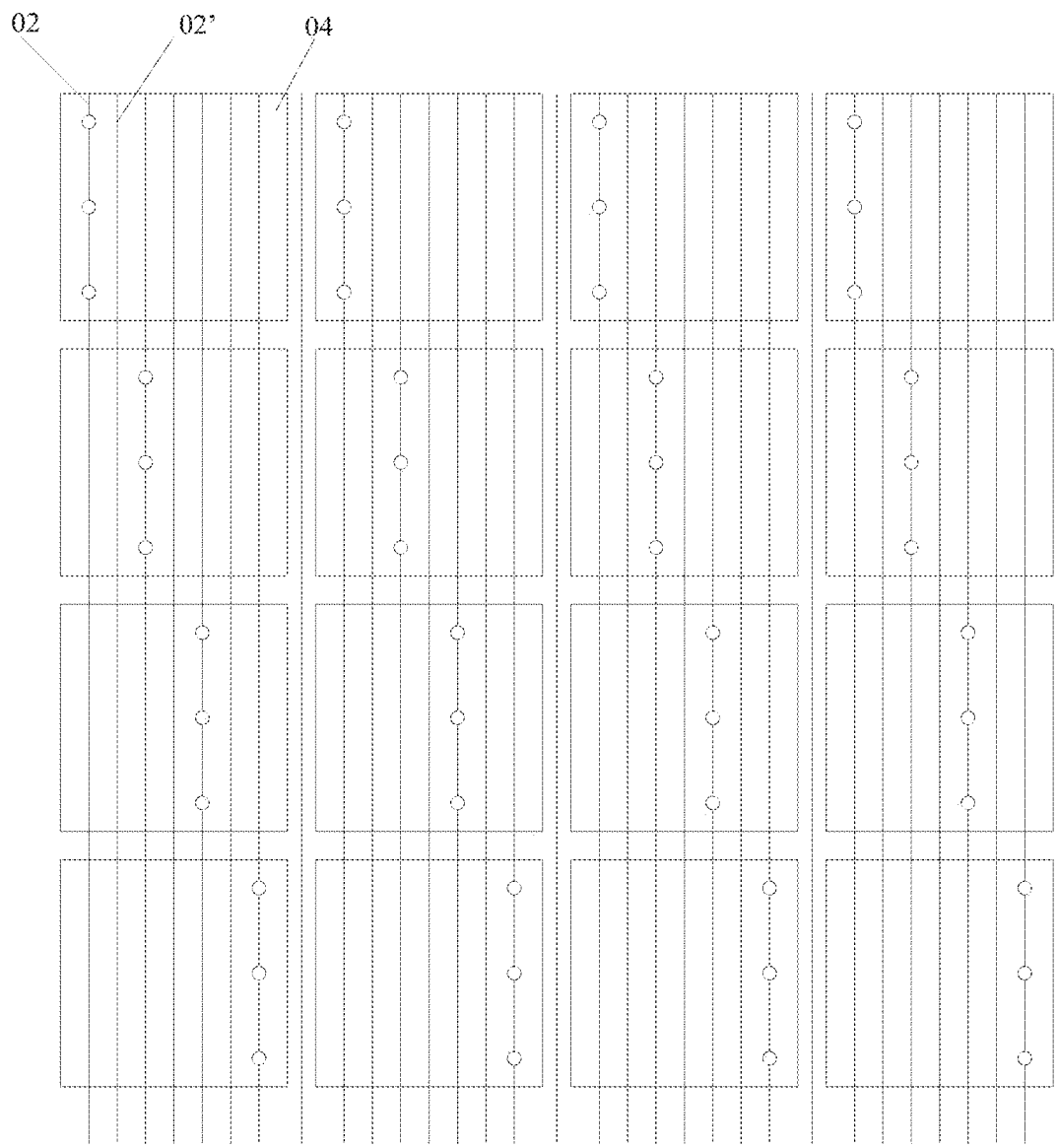
FIG. 3 is a schematic diagram of a distribution between touch signal lines and touch electrodes in the related art.

FIG. 3 illustrates a schematic diagram of a distribution between touch signal lines 02 and touch electrodes 04, where the number of the touch signal lines 02 is the same as the number of columns of the pixel units 01, and each touch electrode 04 can generally cover several pixel units 01, so that the number of the touch electrodes 04 is often smaller than the number of the columns of the pixel units 01. Therefore, not every touch signal line 02 is electrically connected with a touch electrode 04 through a via hole so as to transmit a touch signal, that is, as illustrated in FIG. 3, there exists a floating touch signal line 02' that is not connected with any touch electrode 04. However, with the development of the touch panel, the demand for a touch panel with a high PPI (pixels per inch) is also increasing. In the above-mentioned design of the dual source in-cell touch panel array substrate, in order to ensure that the pixel pitch of each pixel unit remains unchanged, in the case of adding the touch signal lines 02, an aperture ratio of a sub-pixel can only be reduced, which has a significant influence on the pixel aperture ratio in the case of high PPI demand.

An array substrate, a liquid crystal display panel and a display device according to the embodiments of the disclosure can reduce the influence of the touch signal lines on the pixel aperture ratio, so that the overall aperture ratio of the display panel is improved. Moreover, no floating touch signal line exists in a display area, thus related design troubles and defects are also avoided.

The implementations of the array substrate, the liquid crystal display panel and the display device according to the embodiments of the disclosure will be described below in detail with reference to the accompanying drawings. The shapes and sizes of the various components in the drawings do not reflect the actual proportions of the array substrate, and are merely intended to illustrate the disclosure.

Figure 4A:
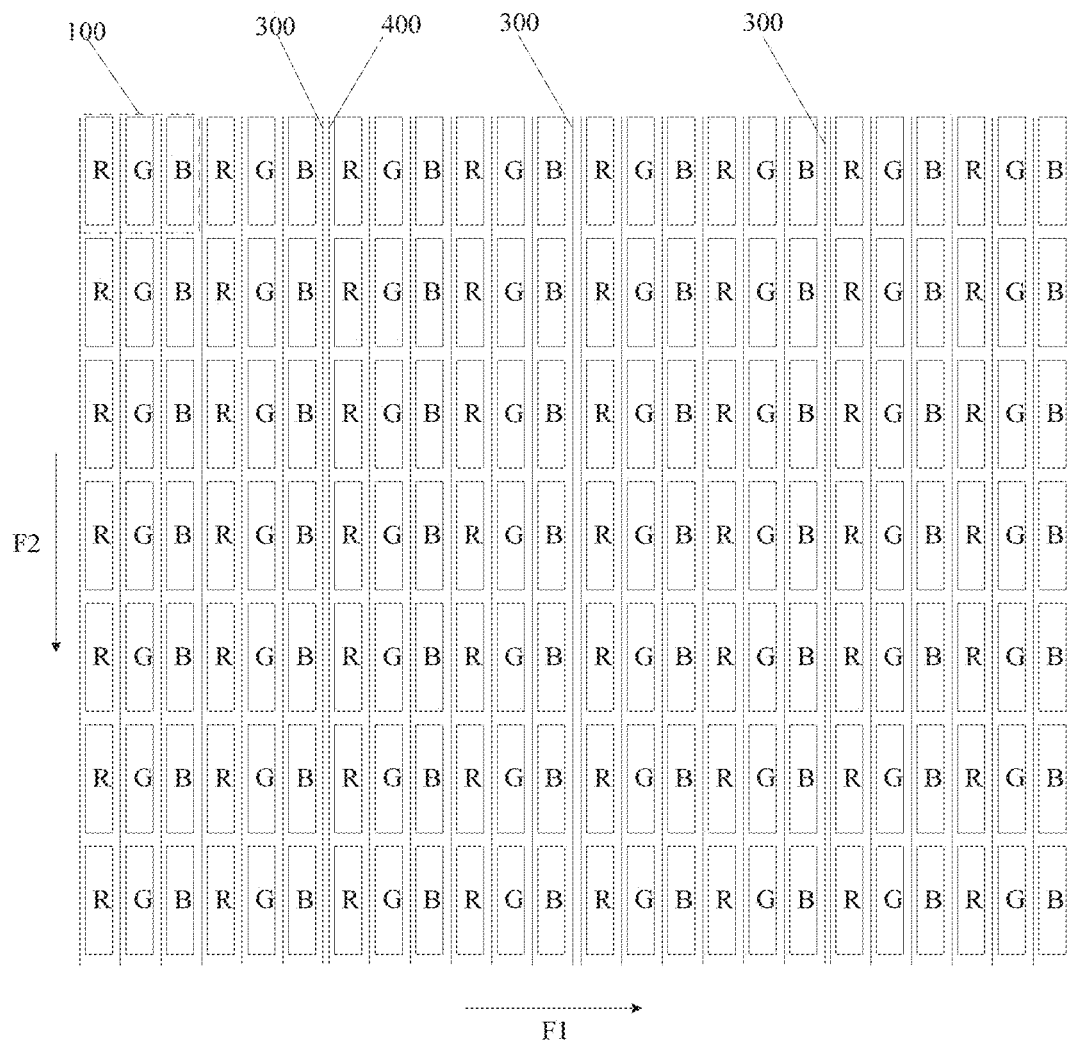
FIG. 4A is a first schematic structural diagram of an array substrate according to the embodiments of the disclosure.
Figure 4B:
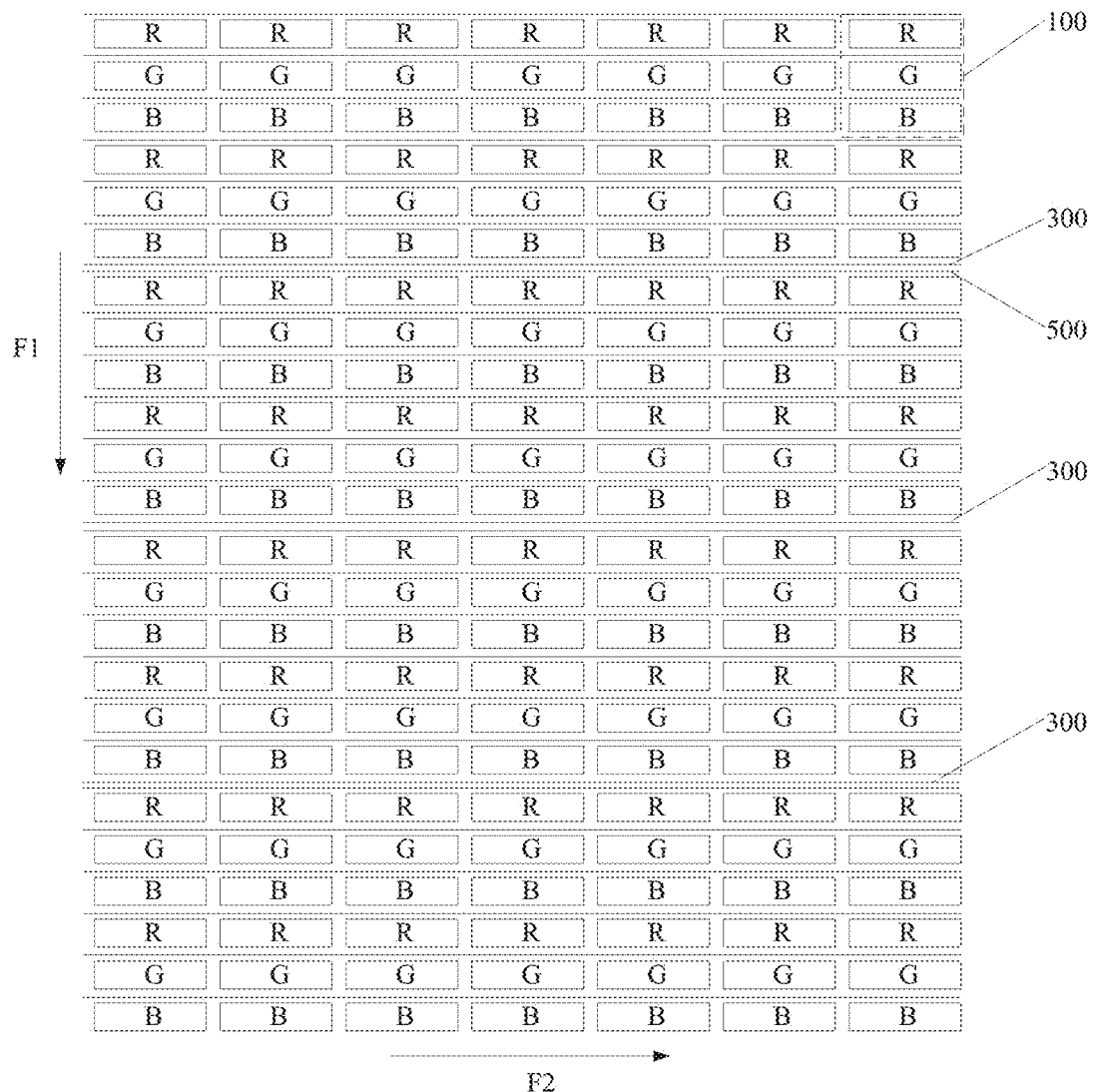
FIG. 4B is a second schematic structural diagram of an array substrate according to the embodiments of the disclosure.
Figure 5A:
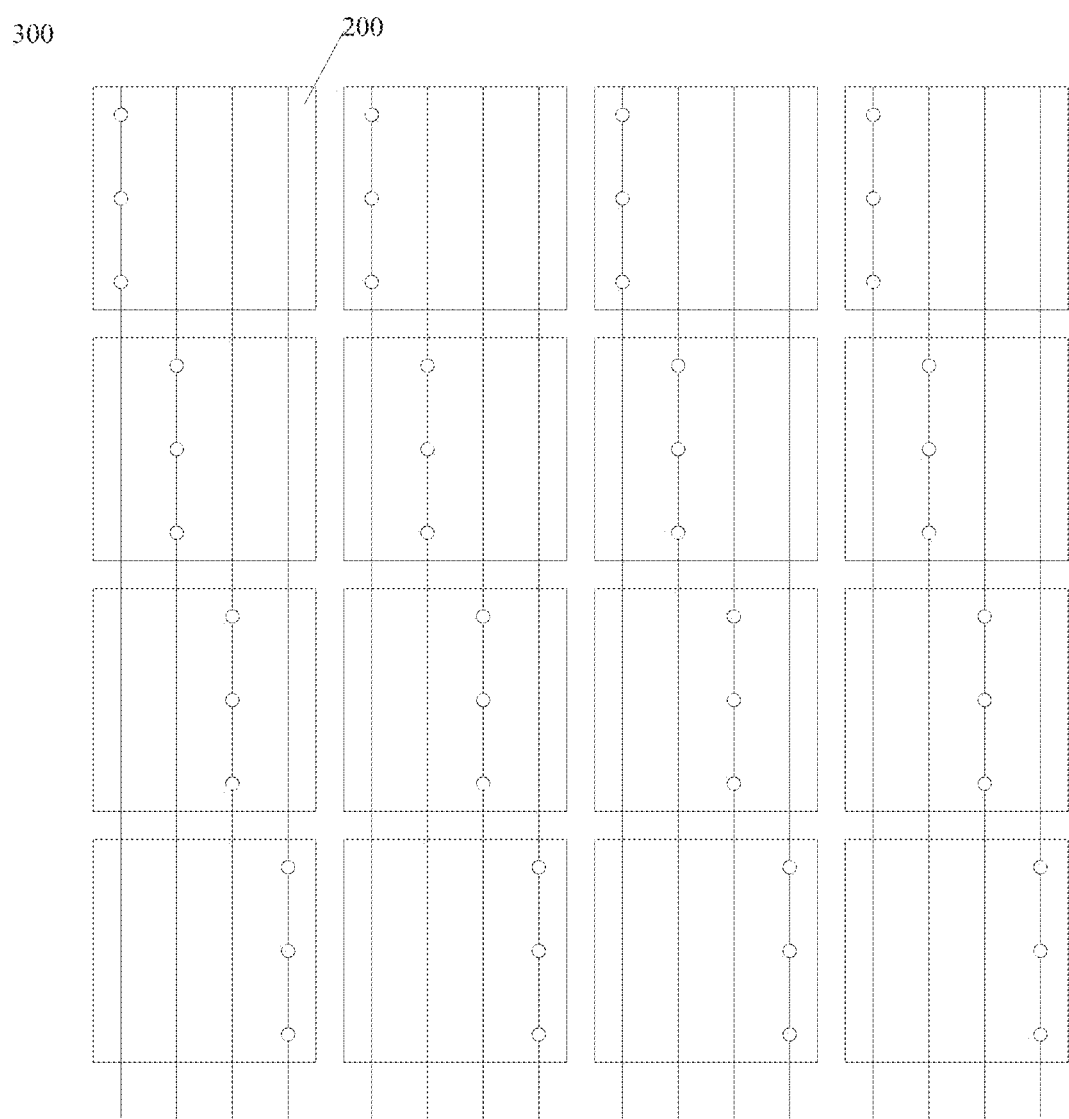
FIG. 5A is a first schematic diagram of a distribution between touch signal lines and touch electrodes in an array substrate according to the embodiments of the disclosure.
Figure 5B:
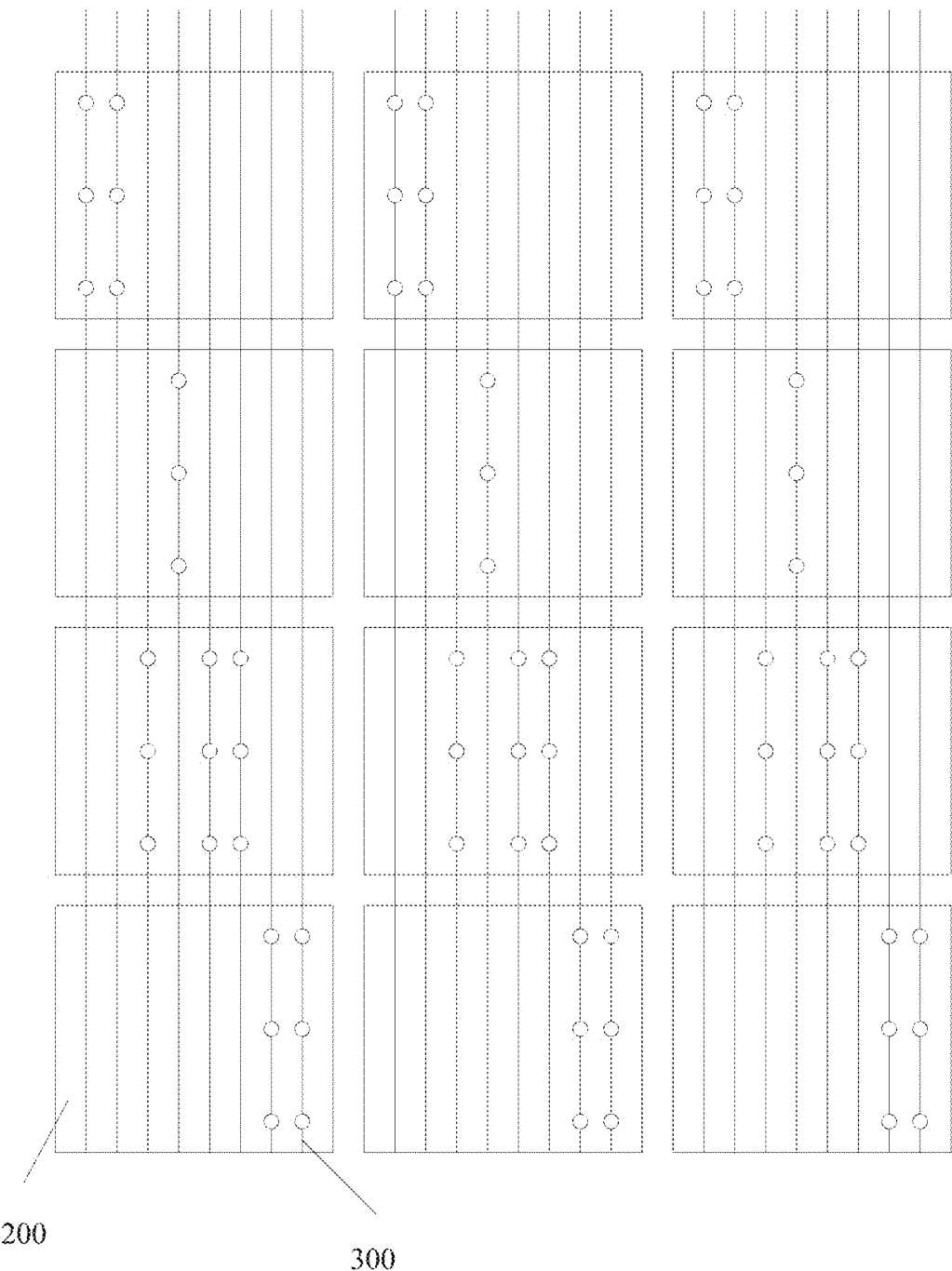
FIG. 5B is a second schematic diagram of a distribution between touch signal lines and touch electrodes in an array substrate according to the embodiments of the disclosure.

As illustrated in FIG. 4A and FIG. 4B, the embodiments of the disclosure provide an array substrate, which includes: a plurality of pixel units 100 distributed in an array, each of the pixel units 100 includes several sub-pixels R, G and B arranged in a first direction F1. As illustrated in FIG. 5A and FIG. 5B, the array substrate further includes a plurality of touch electrodes 200 distributed in an array, where an area where each of the touch electrodes 200 is located overlaps with an area where a plurality of sub-pixels R, G and B are located, that is, an area where one touch electrode 200 is located covers the area where the plurality of sub-pixels R, G and B are located. As illustrated in FIG. 4A and FIG. 4B, the array substrate further includes a plurality of touch signal lines 300 arranged at gaps of sub-pixels R, G and B, where each of the touch signal lines 300 is connected with a touch electrode 200, and no touch floating signal line that is not connected with any touch electrode is present; and respective touch signal lines 300 extend in a second direction F2 and are arranged in the first direction F1, and the first direction F1 intersects with the second direction F2. And a column of the pixel units is correspondingly provided with one of the touch signal lines 300.

In the array substrate according to the embodiments of the disclosure, a plurality of touch signal lines 300 respectively connected with the touch electrodes 200 are arranged only at the gaps of the sub-pixels R, G and B, and no touch floating signal line that is not connected with any touch electrode 200 is present in the array substrate, that is, no floating touch signal lines are arranged in the pixel unit 100 area of the array substrate. Therefore, the actual required number of touch channels (i.e., the number of touch signal lines 300) can be determined according to the number of the touch electrodes 200, and the touch signal lines 300 are arranged in the display area of the array substrate according to the principle that one column of pixel units is correspondingly provided with one touch signal line, so that the area originally used for disposing the floating touch signal lines can be equally distributed to respective sub-pixels so as to increase the aperture ratio of each sub-pixel.

It shall be noted that the adjacency described in the embodiments of the disclosure all represent direct adjacency.

In a specific implementation, the principle of adding the touch signal lines 300 connected to the touch electrodes 200 only in the gaps of the sub-pixels R, G and B may be adopted, and the touch signal lines 300 are uniformly arranged in the display area of the array substrate by spacing every two adjacent touch signal lines 300 by the same number of sub-pixels R, G and B. Further, the number of sub-pixels spacing the two adjacent touch signal lines 300 may be greater than the number of sub-pixels in one pixel unit 100, so that the design scheme of disposing one touch signal line 300 in each pixel unit 100 can be replaced. In this way, the area originally used to dispose the floating touch signal lines can be equally distributed to respective sub-pixels so as to increase the aperture ratio of each sub-pixel.

The disclosure will be described below clearly and fully with reference to some specific embodiments. It shall be noted that the embodiments presented herein are merely intended to better explain the disclosure, but not to limit the disclosure. Further, in the array substrate above according to the embodiments of the disclosure, the case where one pixel unit 100 includes sub-pixels R, G and B is taken as an example, however, in a specific implementation, the pixel unit 100 may further include sub-pixels of other colors, which is not limited herein.

The First Embodiment is as follows.

In a specific implementation, as illustrated in FIG. 4A, the first direction F1 can be set as a row direction, and the second direction F2 can be set as a column direction, that is, the touch signal lines 300 extend in the column direction and are arranged in the row direction. Where, every two adjacent touch signal lines 300 are spaced apart from each other by the same number of sub-pixel R, G and B columns, and are spaced apart from each other by more than the number of sub-pixel R, G and B columns included in one column of the pixel units 100, that is, every two adjacent touch signal lines 300 are spaced apart from each other by more than 3 columns of sub-pixels R, G and B. Specifically, every two adjacent touch signal lines may be spaced apart from each other by 4 columns of sub-pixels. In this case, there exists a touch signal line arranged at a gap between a sub-pixel R column and a sub-pixel G column that are adjacent to each other, a touch signal line arranged at a gap between a sub-pixel G column and a sub-pixel B column that are adjacent to each other, and a touch signal line arranged at a gap between a sub-pixel B column and a sub-pixel R column that are adjacent to each other. Alternatively, every two adjacent touch signal lines may be spaced apart from each other by 5 columns of sub-pixels. In this case, there exists a touch signal line arranged at a gap between a sub-pixel G column and a sub-pixel B column that are adjacent to each other, a touch signal line arranged at a gap between a sub-pixel R column and a sub-pixel G column that are adjacent to each other, and a touch signal line arranged at a gap between a sub-pixel B column and a sub-pixel R column that are adjacent to each other. Alternatively, as illustrated in FIG. 4A, every two adjacent touch signal lines 300 may also be spaced apart from each other by 6 columns of sub-pixels. In this case, each touch signal line 300 may be arranged at a gap between a sub-pixel B column and a sub-pixel R column that are adjacent to each other. Of course, every two adjacent touch signal lines 300 may be spaced apart from each other by 7, 8, etc. columns of sub-pixels, and this needs to be determined according to the actual application environment, which is not limited herein.

The following description will be made by taking an example that every two adjacent touch signal lines 300 are spaced apart from each other by 6 columns of sub-pixels R, G and B, as illustrated in FIG. 4A. The touch signal lines 300 are uniformly arranged in the display area of the array substrate according to the principle of adding the touch signal lines 300 connected to the touch electrodes 200 only in the gaps of the sub-pixels R, G and B, so as to replace the design scheme of disposing one touch signal line 300 at a gap of each pixel unit 100, thereby increasing the aperture ratio of the sub-pixel when the touch signal lines 300 extend in the column direction.

A typical sub-pixel has an opening area for light transmission and a blocking area for blocking a thin film transistor. When the array substrate is applied to a liquid crystal display panel, a pixel electrode is generally arranged in the opening area of the sub-pixel. As illustrated in FIG. 4A, if L columns of pixel units 100 are included in the array substrate, after N touch signal lines 300 are arranged, the number of the touch signal lines 300 is reduced by L-N compared to the design scheme of the array substrate as illustrated in FIG. 2. By reducing the number of the touch signal lines 300, the black matrix (BM) area of the corresponding equivalent sub-pixel is reduced by about 10%, so that the area of the opening area of the sub-pixel is correspondingly increased, thereby ensuring that the influence of the touch signal lines 300 on the pixel aperture ratio is reduced, so as to enhance the overall aperture ratio of the display panel. Moreover, there exists no floating touch signal line in the display area, therefore related design troubles and defects are also avoided.

In a specific implementation, in the array substrate above according to the embodiments of the disclosure, as illustrated in FIG. 4A, signal lines for controlling operations of the pixel units are further arranged at the gaps of the sub-pixels R, G and B in the array substrate; for example, as illustrated in FIG. 4A, the array substrate further includes data signal lines 400 arranged at the gaps of respective sub-pixel R, G and B columns.

In order to reduce the signal interference of the touch signal lines 300 at the gaps of the sub-pixels R, G and B and the data signal lines 400, as illustrated in FIG. 4A, the column gaps of the sub-pixels R, G and B provided with the touch signal lines 300 are set to be greater than the column gaps of the other sub-pixels R, G and B, so that a data signal line 400 and a touch signal line 300 at the same gap will not overlap each other, thereby reducing the signal interference between the data signal line 400 and the touch signal line 300.

In a specific implementation, in the array substrate above according to the embodiments of the disclosure, as illustrated in FIG. 4A, when the array substrate includes a plurality of data signal lines 400 arranged at the gaps of the sub-pixels R, G, and B columns, that is, when the touch signal lines 300 extend in the column direction, in order to simplify the manufacturing operations, the touch signal lines 300 can be arranged in the same layer as the data signal lines 400. In this way, the pattern of the touch signal lines 300 and the data signal lines 400 can be made by using the same metal film layer to simplify the manufacturing process.

In a specific implementation, in the array substrate above according to the embodiments of the disclosure, as illustrated in FIG. 4A, the opening areas of respective sub-pixels R, G and B are generally set to be the same, that is, the areas and shapes of the opening areas of the respective sub-pixels R, G and B are the same. In this way, after the touch signal lines 300 are arranged in the array substrate, the influence of the touch signal lines 300 on the pixel aperture ratio can be distributed to the respective sub-pixels R, G and B in the display area, so that the pitches of some sub-pixels are made smaller in a certain range in the case where the sizes of the opening areas of the respective sub-pixels R, G and B are the same. On average, M columns of sub-pixels R, G and B are combined with one touch signal line 300, which has the same size as M columns of sub-pixels R, G and B that are not provided with a touch signal line 300, thus there is no difference in the overall effect of the pixels.

In a specific implementation, in the array substrate above according to the embodiments of the disclosure, as illustrated in FIG. 5A, one touch electrode 200 can be connected with one touch signal line 300 in a one-to-one correspondence manner. Of course, in a specific implementation, one touch electrode 200 may also be connected with more than one touch signal line 300. For example, as illustrated in FIG. 5B, one touch electrode 200 is connected with two touch signal lines 300, which is not limited herein. Moreover, under the same conditions, the smaller the number of the touch signal lines 300 connected to one touch electrode 200 is, the smaller the influence of the touch signal lines 300 on the pixel aperture ratio will be, and therefore, the number of the touch signal lines 300 should be minimized according to the number of touch channels required.

In a specific implementation, in the array substrate above according to the embodiments of the disclosure, in order to reduce the influence of the touch signal lines 300 added at the gaps of the sub-pixels R, G and B on the display of the array substrate, as illustrated in FIG. 4A, each of the touch signal lines 300 can be adjacent to sub-pixels R, G and B of the same color.

The human eyes are generally less sensitive to blue in visible light than other colors. In a specific implementation, in the array substrate above according to the embodiments of the disclosure, as illustrated in FIG. 4A, each touch signal line 300 can be set to be adjacent to the blue (B) sub-pixels at the time of design to reduce the influence of the added touch signal lines 300 on the display of the array substrate.

In a specific implementation, in the array substrate above according to the embodiments of the disclosure, the touch electrodes 200 can be reused as a common electrode of the pixel units 100, that is, the common electrode connected as a whole surface is divided into block-shaped touch electrodes 200. Common electrode signals are loaded to the touch electrodes 200 via the touch signal lines 300 during a display period, and touch detection signals are loaded to the touch electrodes 200 via the touch signal lines 300 during a touch detection period. That is, the touch electrodes 200 are controlled to realize their functions by time-division signal transmission.

The Second Embodiment is as follows.

In a specific implementation, as illustrated in FIG. 4B, the first direction F1 can be set as the column direction, and the second direction F2 can be set as the row direction, that is, the touch signal lines 300 extend in the row direction and are arranged in the column direction. Where, every two adjacent touch signal lines 300 are spaced apart from each other by the same number of sub-pixel R, G and B rows, and are spaced apart from each other by more than the number of the sub-pixel R, G and B rows included in one row of the pixel units 100, that is, every two adjacent touch signal lines 300 are spaced apart from each other by more than 3 rows of sub-pixels R, G and B. Specifically, every two adjacent touch signal lines may be spaced apart from each other by 4 rows of sub-pixels. In this case, there exists a touch signal line arranged at a gap between a sub-pixel R row and a sub-pixel G row that are adjacent to each other, a touch signal line arranged at a gap between a sub-pixel G row and a sub-pixel B row that are adjacent to each other, and a touch signal line arranged at a gap between a sub-pixel B row and a sub-pixel R row that are adjacent to each other. Alternatively, every two adjacent touch signal lines may be spaced apart from each other by 5 rows of sub-pixels. In this case, there exists a touch signal line arranged at a gap between a sub-pixel G row and a sub-pixel B row that are adjacent to each other, a touch signal line arranged at a gap between a sub-pixel R row and a sub-pixel G row that are adjacent to each other, and a touch signal line arranged at a gap between a sub-pixel B row and a sub-pixel R row that are adjacent to each other. Alternatively, as illustrated in FIG. 4B, every two adjacent touch signal lines 300 may also be spaced apart from each other by 6 rows of sub-pixels. In this case, each touch signal line 300 may be arranged at a gap between a sub-pixel B row and a sub-pixel R row that are adjacent to each other. Of course, every two adjacent touch signal lines 300 may be spaced apart from each other by 7, 8, etc. rows of sub-pixels, and this needs to be determined according to the actual application environment, which is not limited herein.

The following description will be made by taking an example that every two adjacent touch signal lines 300 are spaced apart from each other by 6 rows of sub-pixels R, G and B, as illustrated in FIG. 4B. The touch signal lines 300 are uniformly arranged in the display area of the array substrate according to the principle of adding the touch signal lines 300 connected to the touch electrodes 200 only in the gaps of the sub-pixels R, G and B, so as to replace the design scheme of disposing one touch signal line 300 at a gape of each pixel unit 100, thereby increasing the aperture ratio of the sub-pixel when the touch signal lines 300 extend in the row direction.

In this way, as illustrated in FIG. 4B, if K rows of pixel units 100 are included in the array substrate, after N touch signal lines 300 are arranged, the number of the touch signal lines 300 is reduced by K-N compared to the design scheme of the array substrate as illustrated in FIG. 2. By reducing the number of the touch signal lines 300, the black matrix (BM) area of the corresponding equivalent sub-pixel is reduced by about 10%, so that the area of the opening area of the sub-pixel is correspondingly increased, thereby ensuring that the influence of the touch signal lines 300 on the pixel aperture ratio is reduced, so as to enhance the overall aperture ratio of the display panel. Moreover, no floating touch signal line is present in the display area, therefore related design troubles and defects are also avoided.

In a specific implementation, in the array substrate above according to the embodiments of the disclosure, signal lines for controlling operations of the pixel units are further arranged at the gaps of the sub-pixels R, G and B in the array substrate; for example, as illustrated in FIG. 4B, the array substrate further includes gate signal lines 500 arranged at the gaps of respective sub-pixel R, G and B rows.

In order to reduce the signal interference of the touch signal lines 300 at the gaps of the sub-pixels R, G and B and the gate signal lines 500, as illustrated in FIG. 4B, the row gaps of the sub-pixels R, G and B provided with the touch signal lines 300 are set to be greater than the row gaps of the other sub-pixels R, G and B, so that a gate signal line 500 and a touch signal line 300 at the same gap will not overlap each other, thereby reducing the signal interference between the gate signal line 500 and the touch signal line 300.

In a specific implementation, in the array substrate above according to the embodiments of the disclosure, as illustrated in FIG. 4B, when the array substrate includes a plurality of gate signal lines 500 arranged at the gaps of the sub-pixel R, G, and B rows, that is, when the touch signal lines 300 extend in the row direction, in order to simplify the manufacturing operations, the touch signal lines 300 can be arranged in the same layer as the gate signal lines 500. In this way, the pattern of the touch signal lines 300 and the gate signal lines 500 can be made by using the same metal film layer to simplify the manufacturing process.

In a specific implementation, in the array substrate above according to the embodiments of the disclosure, as illustrated in FIG. 4B, the opening areas of respective sub-pixels R, G and B are generally set to be the same, that is, the areas and shapes of the opening areas of the respective sub-pixels R, G and B are the same. In this way, after the touch signal lines 300 are arranged in the array substrate, the influence of the touch signal lines 300 on the pixel aperture ratio can be distributed to the respective sub-pixels R, G and B in the display area, so that the pitches of some sub-pixels are made smaller in a certain range in the case where the sizes of the opening areas of the respective sub-pixels R, G and B are the same. On average, Y rows of sub-pixels R, G and B are combined with one touch signal line 300, which has the same size as Y rows of sub-pixels R, G and B that are not provided with the touch signal line 300, thus there is no difference in the overall effect of the pixels.

Figure 6A:
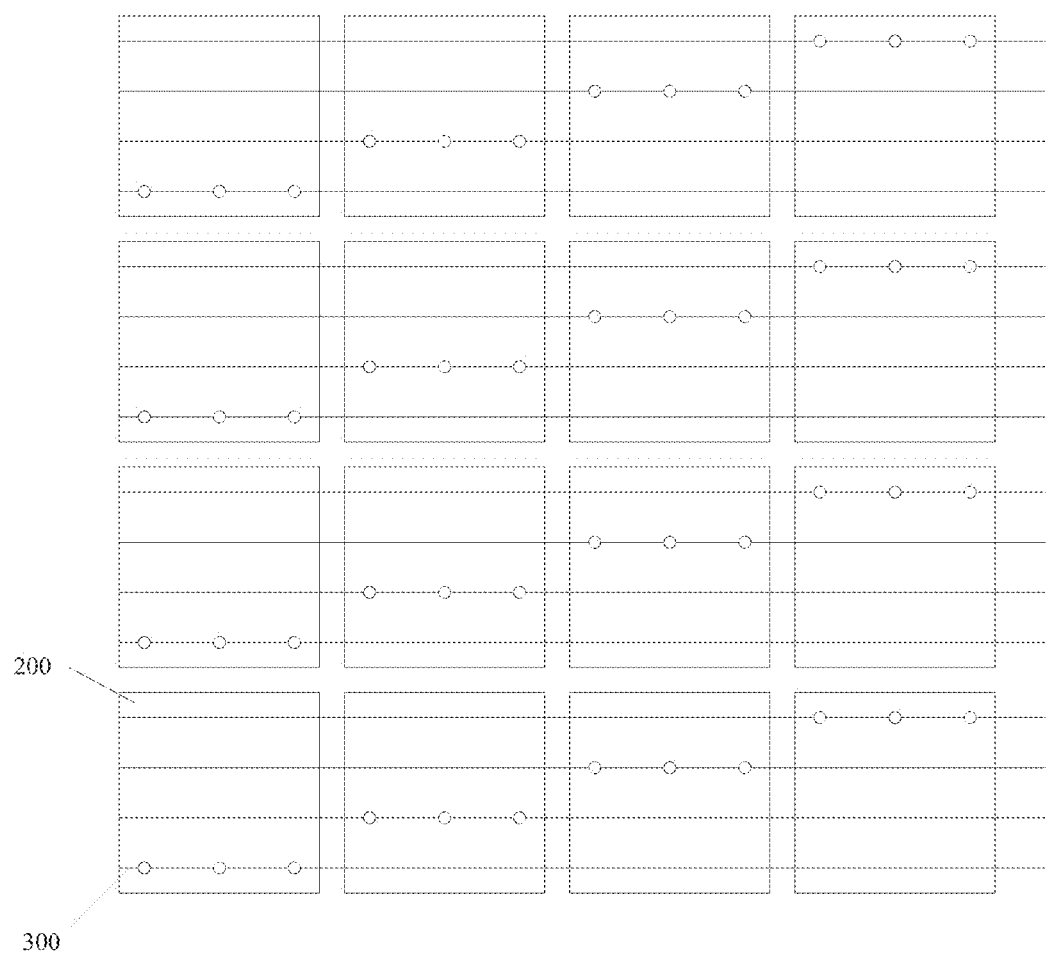
FIG. 6A is a third schematic diagram of a distribution between touch signal lines and touch electrodes in an array substrate according to the embodiments of the disclosure.
Figure 6B:
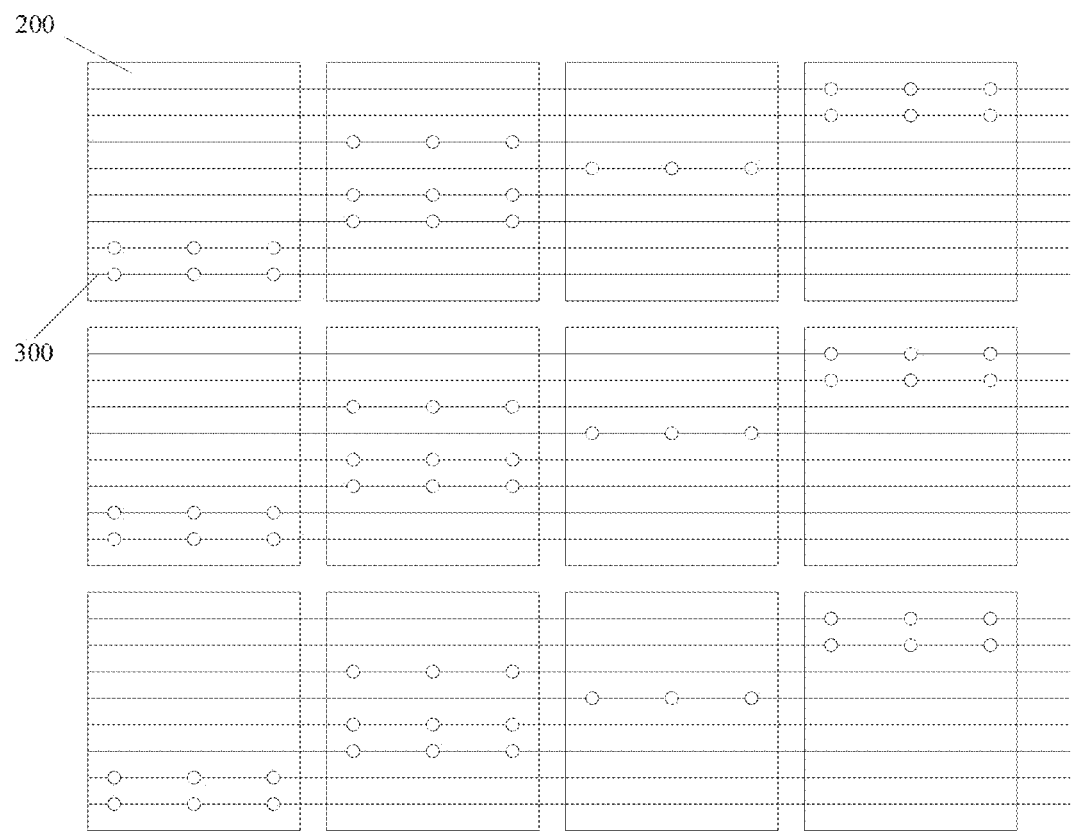
FIG. 6B is a fourth schematic diagram of a distribution between touch signal lines and touch electrodes in an array substrate according to the embodiments of the disclosure.

In a specific implementation, in the array substrate above according to the embodiments of the disclosure, as illustrated in FIG. 6A, one touch electrode 200 can be connected with one touch signal line 300 in a one-to-one correspondence manner. Of course, in a specific implementation, one touch electrode 200 may also be connected with more than one touch signal line 300. For example, as illustrated in FIG. 6B, one touch electrode 200 is connected with two touch signal lines 300, which is not limited herein. Moreover, under the same conditions, the smaller the number of the touch signal lines 300 connected to one touch electrode 200 is, the smaller the influence of the touch signal lines 300 on the pixel aperture ratio will be, and therefore, the number of the touch signal lines 300 should be minimized according to the number of touch channels required.

In a specific implementation, in the array substrate above according to the embodiments of the disclosure, in order to reduce the influence of the touch signal lines 300 added at the gaps of the sub-pixels R, G and B on the display of the array substrate, as illustrated in FIG. 4B, each of the touch signal lines 300 can be adjacent to sub-pixels R, G and B of the same color.

The human eyes are generally less sensitive to blue in visible light than other colors. In the array substrate above according to the embodiments of the disclosure, as illustrated in FIG. 4B, each touch signal line 300 can be set to be adjacent to the blue (B) sub-pixels at the time of design to reduce the influence of the added touch signal lines 300 on the display of the array substrate.

In a specific implementation, in the array substrate above according to the embodiments of the disclosure, the touch electrodes 200 can be reused as a common electrode of the pixel units 100, that is, the common electrode connected as a whole surface is divided into block-shaped touch electrodes 200. Common electrode signals are loaded to the touch electrodes 200 via the touch signal lines 300 during a display period, and touch detection signals are loaded to the touch electrodes 200 via the touch signal lines 300 during a touch detection period. That is, the touch electrodes 200 are controlled to realize their functions by means of time-division signal transmission.

Based upon the same inventive concept, the embodiments of the disclosure further provide a liquid crystal display panel. Since the liquid crystal display panel addresses the problem under a similar principle to the array substrate above, reference can be made to the implementation of the array substrate above for an implementation of the liquid crystal display panel, so a repeated description thereof will be omitted here.

Figure 7:
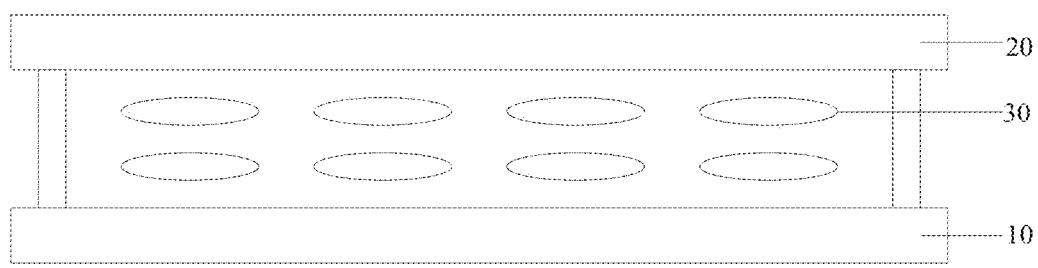
FIG. 7 is a schematic structural diagram of a liquid crystal display panel according to the embodiments of the disclosure.

Specifically, the liquid crystal display panel above according to the embodiments of the disclosure, as illustrated in FIG. 7, includes the array substrate 10 above according to the embodiments of the disclosure. Further, as illustrated in FIG. 7, an opposite substrate 20 arranged opposite to the array substrate 10, and a liquid crystal layer 30 arranged between the opposite substrate 10 and the array substrate 10 are generally further included. Of course, components such as an upper polarizer and a lower polarizer may be further included, and will not be described in detail herein.

Based upon the same inventive concept, the embodiments of the disclosure further provide a display device, including the liquid crystal display panel above according to the embodiments of the disclosure. The display device can be a mobile phone, a tablet computer, a television, a display, a notebook computer, a digital photo frame, a navigator or any product or component that has a display function. For the implementation of the display device, reference can be made to the embodiments of the foregoing liquid crystal display panel, so a repeated description thereof will be omitted here.

According to the array substrate, the liquid crystal display panel and the display device according to the embodiments of the disclosure, a plurality of touch signal lines respectively connected with the touch electrodes are arranged only at the gaps of the sub-pixels, and no touch floating signal line that is not connected with any touch electrode is present in the array substrate, that is, no floating touch signal lines are arranged in the pixel unit area of the array substrate. Therefore, the actual required number of touch channels, i.e., the number of touch signal lines, can be determined according to the number of the touch electrodes, and the touch signal lines 300 are arranged in the display area of the array substrate according to the principle that one column of pixel units is correspondingly provided with one touch signal line, so that the area originally used for disposing the floating touch signal lines can be equally distributed to each sub-pixel so as to increase the aperture ratio of each sub-pixel.

Evidently those skilled in the art can make various modifications and variations to the present disclosure without departing from the spirit and scope of the present disclosure. Accordingly the present disclosure is also intended to encompass these modifications and variations thereto so long as the modifications and variations come into the scope of the claims appended to the present disclosure and their equivalents.

The invention claimed is:

1. An array substrate, comprising:
a plurality of pixel units distributed in an array, wherein each of the plurality of pixel units comprises several sub-pixels arranged in a first direction;
a plurality of touch electrodes distributed in an array, wherein an area where each of the plurality of touch electrodes is located overlaps with an area where a plurality of sub-pixels are located; and
a plurality of touch signal lines arranged at gaps of sub-pixels;
wherein each of the plurality of touch signal lines is connected with a touch electrode, and no touch floating signal line that is not connected with any touch electrode is present;
wherein respective touch signal lines extend in a second direction and are arranged in the first direction; the first direction intersects with the second direction; and
a column of the plurality of pixel units is correspondingly provided with one of the plurality of touch signal lines; and
wherein the first direction refers to a row direction, the second direction refers to a column direction, and every two adjacent touch signal lines are spaced apart from each other by a same number of sub-pixel columns which is greater than a number of sub-pixel columns included in one column of the plurality of pixel units.

2. The array substrate according to claim 1, wherein one of the plurality of touch electrodes is connected with one of the plurality of touch signal lines in a one-to-one correspondence manner.

3. The array substrate according to claim 1, wherein column gaps of sub-pixels provided with a touch signal line are larger than column gaps of the other sub-pixels.

4. The array substrate according to claim 3, further comprising: a plurality of data signal lines arranged at gaps of respective sub-pixel columns; wherein each of the plurality of touch signal lines is arranged in a same layer as each of the plurality of data signal lines.

5. The array substrate according to claim 1, wherein the areas and shapes of opening areas of respective sub-pixels are the same.

6. The array substrate according to claim 1, wherein each of the plurality of touch signal lines is adjacent to sub-pixels of a same color.

7. The array substrate according to claim 6, wherein each of the plurality of touch signal lines is adjacent to blue sub-pixels.

8. The array substrate according to claim 1, wherein the plurality of touch electrodes are reused as a common electrode of the array substrate.

9. A liquid crystal display panel, comprising an array substrate, wherein the array substrate comprises:
  a plurality of pixel units distributed in an array, wherein each of the plurality of pixel units comprises several sub-pixels arranged in a first direction;
  a plurality of touch electrodes distributed in an array, wherein an area where each of the plurality of touch electrodes is located overlaps with an area where a plurality of sub-pixels are located; and
  a plurality of touch signal lines arranged at gaps of sub-pixels;
  wherein each of the plurality of touch signal lines is connected with a touch electrode, and no touch floating signal line that is not connected with any touch electrode is present;
  wherein respective touch signal lines extend in a second direction and are arranged in the first direction; the first direction intersects with the second direction; and
  a column of the plurality of pixel units is correspondingly provided with one of the plurality of touch signal lines; and
  wherein the first direction refers to a row direction, the second direction refers to a column direction, and every two adjacent touch signal lines are spaced apart from each other by a same number of sub-pixel columns which is greater than a number of sub-pixel columns included in one column of the plurality of pixel units.

10. A display device, comprising the liquid crystal display panel according to claim 9.

11. An array substrate, comprising:
  a plurality of pixel units distributed in an array, wherein each of the plurality of pixel units comprises several sub-pixels arranged in a first direction;
  a plurality of touch electrodes distributed in an array, wherein an area where each of the plurality of touch electrodes is located overlaps with an area where a plurality of sub-pixels are located; and
  a plurality of touch signal lines arranged at gaps of sub-pixels;
  wherein each of the plurality of touch signal lines is connected with a touch electrode, and no touch floating signal line that is not connected with any touch electrode is present;
  wherein respective touch signal lines extend in a second direction and are arranged in the first direction; the first direction intersects with the second direction; and
  a column of the plurality of pixel units is correspondingly provided with one of the plurality of touch signal lines; and
  wherein the first direction refers to a column direction, the second direction refers to a row direction, and every two adjacent touch signal lines are spaced apart from each other by a same number of sub-pixel rows which is greater than a number of sub-pixel rows included in one row of the plurality of pixel units.

12. The array substrate according to claim 11, wherein one of the plurality of touch electrodes is connected with one of the plurality of touch signal lines in a one-to-one correspondence manner.

13. The array substrate according to claim 11, wherein row gaps of sub-pixels provided with a touch signal line are larger than row gaps of the other sub-pixels.

14. The array substrate according to claim 13, further comprising: a plurality of gate signal lines arranged at gaps of respective sub-pixel rows; wherein each of the plurality of touch signal lines is arranged in a same layer as each of the plurality of gate signal lines.

15. The array substrate according to claim 11, wherein the areas and shapes of opening areas of respective sub-pixels are the same.

16. The array substrate according to claim 11, wherein each of the plurality of touch signal lines is adjacent to sub-pixels of a same color.

17. The array substrate according to claim 16, wherein each of the plurality of touch signal lines is adjacent to blue sub-pixels.

18. The array substrate according to claim 11, wherein the plurality of touch electrodes are reused as a common electrode of the array substrate.

19. A liquid crystal display panel, comprising an array substrate according to claim 11.

20. A display device, comprising the liquid crystal display panel according to claim 19.

* * * * *